United States Patent
Trinh et al.

(10) Patent No.: US 7,570,304 B1
(45) Date of Patent: *Aug. 4, 2009

(54) METHOD, APPARATUS AND COMPUTER PROGRAM PRODUCT FOR SYNCHRONIZING PRESENTATION OF DIGITAL VIDEO DATA WITH SERVING OF DIGITAL VIDEO DATA

(75) Inventors: Vincent Trinh, Pleasanton, CA (US); Michael Ignaszewski, Fremont, CA (US); Jacques Mahe, Fremont, CA (US)

(73) Assignee: Sigma Designs, Inc., Milpitas, CA (US)

( * ) Notice: Subject to any disclaimer, the term of this patent is extended or adjusted under 35 U.S.C. 154(b) by 1148 days.

This patent is subject to a terminal disclaimer.

(21) Appl. No.: 10/719,986

(22) Filed: Nov. 21, 2003

(51) Int. Cl.
*H04N 9/475* (2006.01)

(52) U.S. Cl. .................. 348/512; 348/515; 375/365; 370/509

(58) Field of Classification Search .......... 348/515, 348/512, 518, 423.1, 500; 375/240.28, 364–366; 370/503–522; 713/400; 725/100, 91, 95, 725/131

See application file for complete search history.

(56) References Cited

U.S. PATENT DOCUMENTS

| | | | | |
|---|---|---|---|---|
| 5,430,485 A | * | 7/1995 | Lankford et al. | 348/423.1 |
| 5,559,999 A | * | 9/1996 | Maturi et al. | 713/400 |
| 5,594,660 A | * | 1/1997 | Sung et al. | 715/203 |
| 6,148,135 A | * | 11/2000 | Suzuki | 386/12 |
| 6,654,956 B1 | * | 11/2003 | Trinh et al. | 725/100 |

* cited by examiner

*Primary Examiner*—M. Lee
(74) *Attorney, Agent, or Firm*—Virtual Law Partners LLP

(57) ABSTRACT

The present invention provides a method for matching the rate of presentation of digital video data at a receiver/client with the rate the server is serving the data without the need of a voltage control oscillator or other hardware. An embodiment of the invention compares the presentation time at the receiver with the server elapsed time estimated from timestamp values on the served data. When the presentation time and the server elapsed time differ by an unacceptably large amount, an adjustment is made to the audio data stream to re-synchronize the presentation time with the elapsed time, which effectively also synchronizes the overall presentation rate with the overall server rate. The video data stream is then synchronized to the adjusted audio stream. The video data stream and audio data stream are converted to analog signals for presentation.

37 Claims, 3 Drawing Sheets

METHOD, APPARATUS AND COMPUTER PROGRAM PRODUCT FOR SYNCHRONIZING PRESENTATION OF DIGITAL VIDEO DATA WITH SERVING OF DIGITAL VIDEO DATA

CROSS-REFERENCE TO RELATED APPLICATION

This application hereby incorporates by reference and claims benefit of U.S. application Ser. No. 09/546,055, filed Apr. 10, 2000, now U.S. Pat. No. 6,654,956.

BACKGROUND OF THE INVENTION

1. Field of the Invention

This invention relates to the field of digital video; specifically, this invention is a method, apparatus, and system for synchronizing presentation of video data at a receiver with serving of data at a server.

2. Background

In digital video, a receiver/client can receive digital video data that is served by a server over a communication channel. Digital video data includes a video component and an audio component. The audio component has a fixed audio time interval. The video component typically has a fixed number of frames per second. The data is typically sent in a standard digital video format such as the MPEG format; however, the invention also applies to time-stamped information that is in a format other than MPEG.

The server typically has MPEG encoding capability, though this is not necessary when pre-encoded files are being served. The receiver is a client to the server. The receiver includes a video interface that is capable of decoding MPEG data. The terms "receiver", "receiver/client", and "receiver/decoder" all refer to the receiver.

MPEG data includes timing information, which is used to drive presentation devices where the data needs to be presented in accordance with the time stamp to provide a smooth presentation and where the time stamp is used to synchronize the audio and video presentations. Time stamps are used to indicate to a decoder/receiver when a specific event should occur. For the video component, the time stamp tells the decoder/receiver when a frame should be displayed. For the audio component, the time stamp tells the decoder the specific moment in time when a sound should be played. The amount of data necessary to provide a specific time interval of presentation, such as 1 second, can vary widely.

The receiver must process the MPEG data before that data can be used to drive a presentation device such as a monitor and/or speakers. The processing includes demultiplexing the MPEG data into an audio stream and a video stream, synchronizing the playback of the separated data streams, and converting the digital data to analog signals. Processing can be accomplished in software or hardware, although hardware is usually used because of its speed advantage.

The server serves video data in real-time; that is, the data is served at approximately the rate at which it should be presented. The server knows when it should deliver the data based on the time stamps embedded in the MPEG stream. Timestamps in MPEG are included periodically, and at a minimum once every 0.7 seconds. Time measurement at the server governs the rate at which the server serves data. (The server can send pre-encoded files or can send real-time data. In the case of a pre-encoded file, the clock of the server processor determines the rate. In the case of a real-time feed, the clock inside the encoder at the server determines the rate. In this application, the term "server clock" is used generically to indicate whatever clock is determining the serving rate of the video date.)

The receiver consumes data in real-time. If time at the server were measured exactly equal to time at the receiver, the receiver would consume data at the same rate as it is served, and presentation of the data would be smooth.

(The receiver typically buffers an amount of data prior to beginning display, thus a temporary drop in the rate of reception of the data due to interruption of the communication link or server is usually not an issue. A buffer is usually included in both the receiver processor as well as the decoder/video interface. The size of the buffer is not critical, but should be big enough so that such network jitter is not an issue.)

However, in practical application, time measurement at the server and at the receiver are not exactly the same. This results in data being served at a different rate than it is consumed, and eventually buffer underflow or overflow at the receiver occurs. Underflow or overflow results in undesirable effects such as jumpiness of the picture.

This example uses exaggerated numbers to illustrate the problem resulting from the two clocks measuring time differently: Suppose a server sends 1 byte every 1 second (according to the server's clock), and a receiver consumes 1 byte every 1 second (according to the client's clock). The receiver has a 5-byte buffer. Suppose the server's clock is perfectly accurate. The receiver's clock is flawed. "Time" moves slower in this clock. For every 2 "real" seconds that pass, the receiver's clock counts 1 second passing. The buffer of the receiver will overflow within 5 or 6 seconds due to the different rates of serving and consuming the data.

In practical application, the clocks used in typical servers and receivers are much more accurate than in the previous example, but typically there is about a 50 parts per million (ppm) variance. Assuming a 50 ppm variance, every 200000 bytes there will be a difference of around 1 byte. A commonly used serving rate is 48,000 samples per second and commonly there are 4 bytes per audio sample. This results in a potential discrepancy of about 1 byte per second (1 sample every 4 seconds).

In addition, a further source of error from the "true" time is that the server clock as well as the receiver clock can experience internal variation—i.e. they each can speed up sometimes and slow up at other times. Thus at times the server clock may be counting time faster than the receiver clock, and at other times the opposite may happen.

It should be noted that this problem of lack of synchronization is not present when the digital video data is from a local source. For instance, synchronization of serving rate and consumption rate by the receiver is not a problem when the data is on a DVD disk and is played on a local DVD player, because the receiver can access the data as it requires it.

It is known to use a phase lock loop circuit implemented using a voltage control oscillator to match the data presentation rate with the server rate. However, these hardware components are relatively expensive.

Thus, it would be advantageous to synchronize presentation of video data at a receiver with the rate the data is served by a video server without the need for a voltage control oscillator. This is achieved through real-time adjustments to the audio stream and subsequent synchronization of the video stream with the adjusted audio stream.

SUMMARY OF THE INVENTION

The present invention provides a method for matching the rate of presentation of digital video data at a receiver/client with the rate the server is serving the data without the need of a voltage control oscillator or other hardware. An embodiment of the invention compares the presentation time at the receiver with the server elapsed time estimated from timestamp values on the served data. When the presentation time and the server elapsed time differ by an unacceptably large amount, an adjustment is made to the audio data stream to re-synchronize the presentation time with the elapsed time, which effectively also synchronizes the overall presentation rate with the overall server rate. The video data stream is then synchronized to the adjusted audio stream. The video data stream and audio data stream are converted to analog signals for presentation.

The foregoing and many other aspects of the present invention will no doubt become obvious to those of ordinary skill in the art after having read the following detailed description of a preferred embodiments that are illustrated in the various drawing figures.

DESCRIPTION OF A PREFERRED EMBODIMENT

Figure 1:
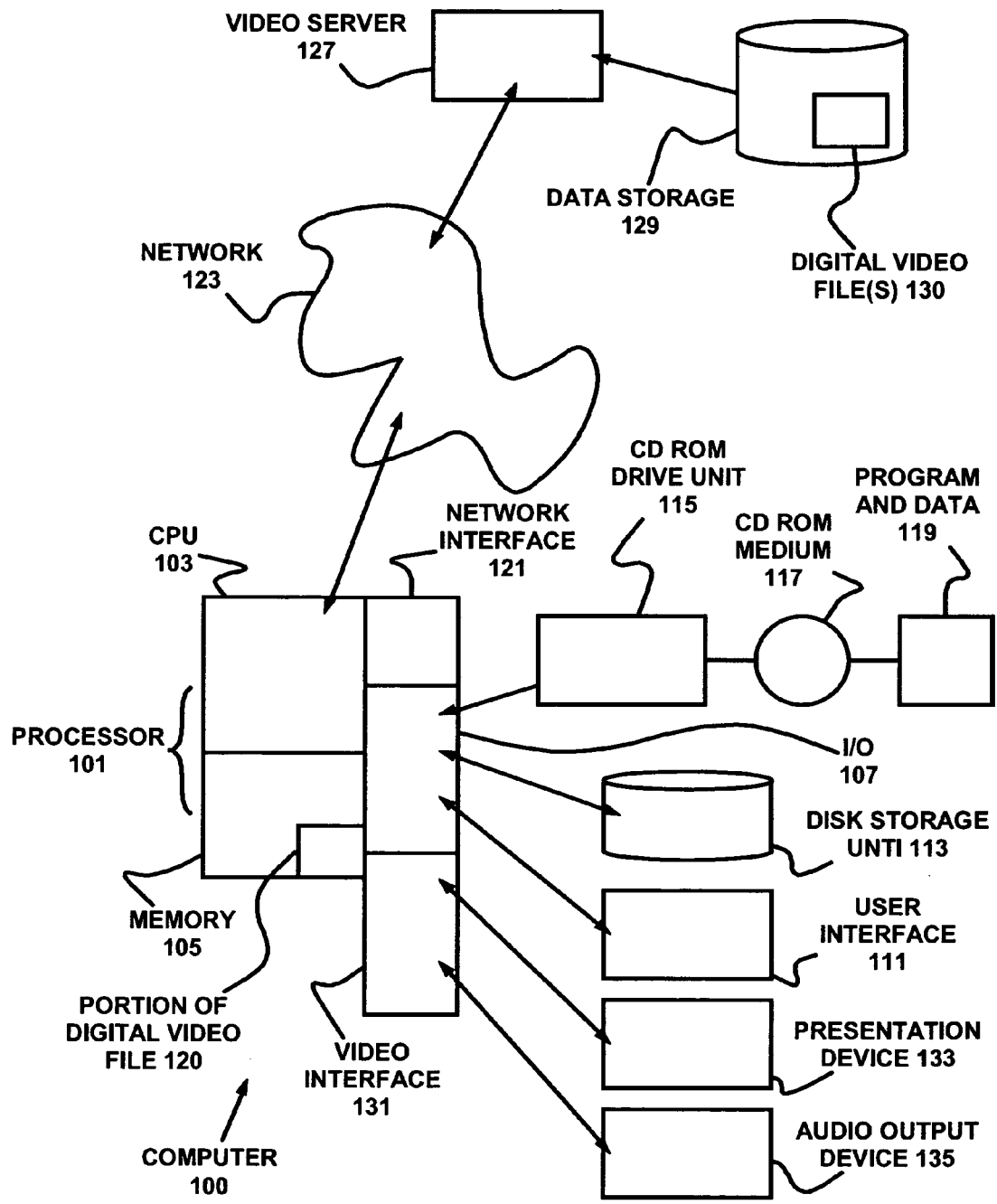
FIG. 1 illustrates a computer system capable of using the invention in accordance with a preferred embodiment.

FIG. 1 illustrates a computer, indicated by general reference character 100, that incorporates the invention. The computer 100 includes a processor 101 that incorporates a central processor unit (CPU) 103, a memory section 105 and an input/output (I/O) section 107, and that can also incorporate a clock (not shown). The input/output (I/O) section 107 is connected to a user interface 111, a disk storage unit 113 and a CD-ROM drive unit 115. The CD-ROM drive unit 115 can read a CD-ROM medium 117 that typically contains a program and data 119. The CD-ROM drive unit 115 (along with the CD-ROM medium 117) and the disk storage unit 113 comprise a filestorage mechanism. The memory section 105 can include a portion of a digital video file 120.

A network interface 121 connects the computer 100 to a network 123. A video server 127 is connected to the network. The video server 127 is connected to a data storage 129. The data storage 129 can include one or more remote digital video files 130.

The input/output (I/O) section 107 is connected to a video interface 131. The video interface 131 is connected to a presentation device 133 and an audio output 135. It will be clear to one skilled in the art that the various devices including the presentation device 133, audio output 135, and video interface 131 can be connected in different configurations and can include elements such as monitors, keyboards, and speakers.

One skilled in the art will understand that not all of the displayed features of the computer 100 need to be present for the invention; that the CD-ROM drive unit 115 provides a mechanism for reading removable media and thus can be replaced by any other drive that is capable of reading compatible removable media; and that the invention can be practiced by customized logic that implements the steps of the invention, and that digital video formats in addition to MPEG can be used.

Figure 2:
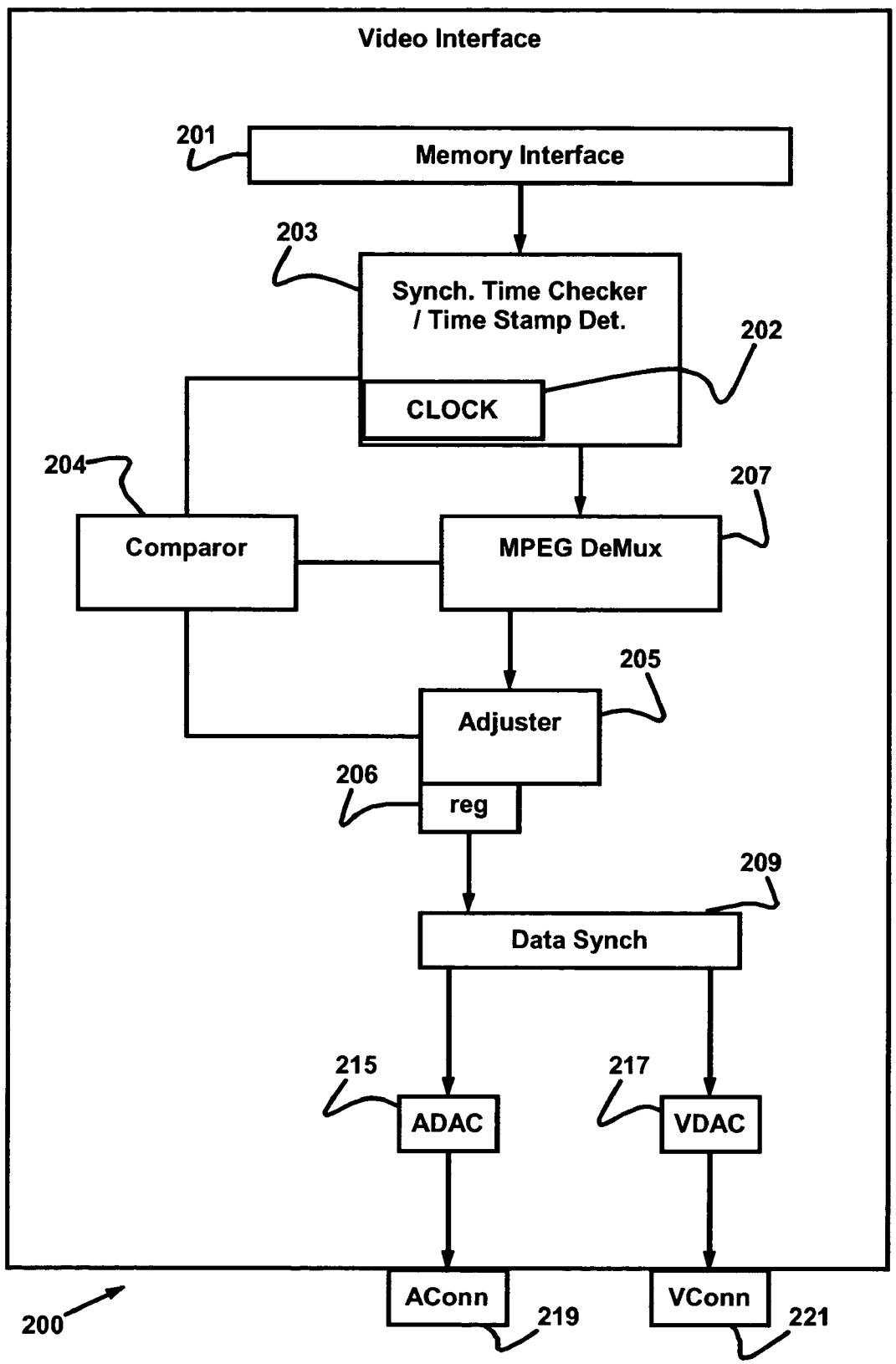
FIG. 2 illustrates a video interface in accordance with a preferred embodiment of the invention.

FIG. 2 illustrates a video interface, indicated by general reference character 200. This video interface 200 is an example of the video interface 131 of FIG. 1. The video interface has a memory interface 201.

Video data is supplied to the video interface 200 through the memory interface 201. The MPEG data can be sourced from one of the remote digital video files 130 stored in data storage 129 served over the network 123 by the video server 127; or can be sourced from a file residing locally on CD-ROM medium 117, or can be an MPEG formatted file stored and communicated to the memory interface by any known means. In the case of sourcing from a local CD-ROM medium, there is no need for synchronization with a remote clock, so in such a case the invention need not be used, though such data can be processed through the video interface 200.

The MPEG data flows through a synchronization time checker/time stamp detector 203, to a demultiplexer 207. The synchronization time checker/time stamp detector 203 keeps track of local time using a clock 202, and periodically (for example, about every ten minutes) it will start monitoring the data stream for a time stamp. Upon detecting a time-stamp in the MPEG data stream, the synchronization time checker/time stamp detector 203 passes to the comparor/calculator 204 the information about the time-stamp and the local time when the time-stamp was detected. The comparor/calculator 204 compares a presentation time with an elapsed time and estimates how much adjustment, if any, is required to match the rate at which the server is serving the data with the local (receiver) presentation rate, and if adjustment is required sends an adjustment value representing the necessary adjustment to an adjustor 205 having a register 206. The adjustment value is stored in the register 206. This is more fully discussed in the description of FIG. 3 below.

Alternatively, the synchronization time checker/time stamp detector 203 can obtain the time from a clock (not shown) incorporated in the processor 101, or can otherwise obtain the time from any clock referred to by the receiver. Intervals longer than or shorter than 10 minutes can be used; however, one embodiment that works well uses intervals between 5 minutes and 10 minutes.

The data continually flows to a demultiplexer 207 from the synchronization time checker/time stamp detector 203. The demultiplexer 207 demultiplexes the MPEG data into a video data stream and an audio data stream (the audio data stream results from the decoding of the demultiplexed mpeg audio data), as is known in the art. An audio sample is the value of the sound wave at a particular moment. The audio data stream flows to the adjustor 205 where samples are added or dropped from the audio data stream in accordance with the adjustment value stored in the register 206, as described below in the description of FIG. 3.

The adjusted audio data stream that is output from the adjustor 205 and the video data that is output from the demultiplexer 207 are sent to an audio-video synchronizer 209. The audio-video synchronizer 209 aligns the audio data and the video data in accordance with their respective timing stamps as is known in the art.

The audio data stream flows to an audio digital/analog converter 215 which converts the audio data stream to an analog audio signal. The video data stream flows to a video digital/analog converter 217 which converts the video data stream to an analog video signal. The audio analog signal and the video analog signal are then sent to an audio connector 219 and a video connector 221 for transfer to audio and video presentation devices, respectively.

Figure 3:
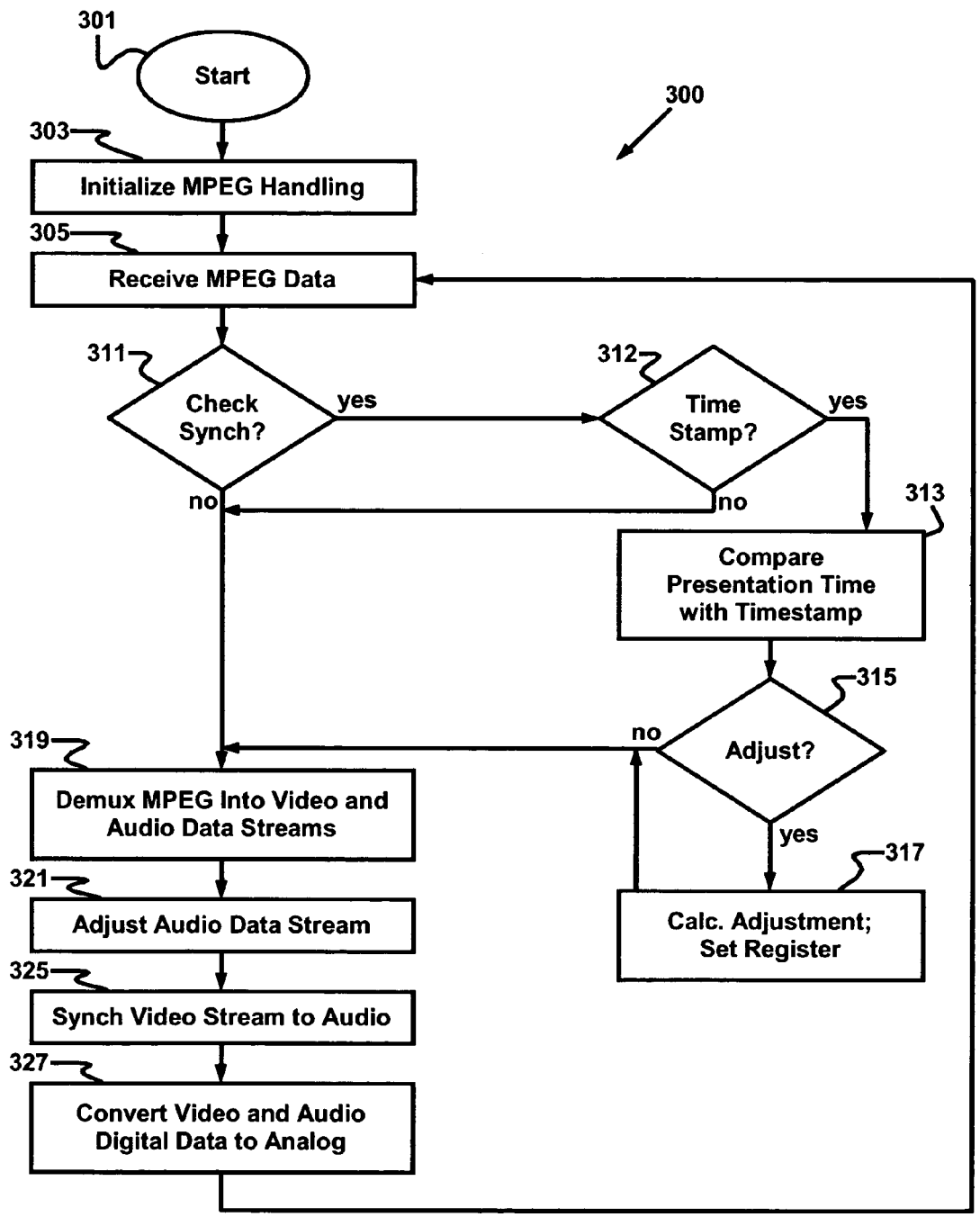
FIG. 3 illustrates a method of the invention in accordance with a preferred embodiment.

FIG. 3 illustrates a method for synchronizing display of a digital video file with the rate of serving by a video server, indicated by general reference character 300.

The method initiates at a start terminal 301. Initialization of variables and initialization of MPEG handling is accomplished at an initialization step 303. In the preferred embodiment, initialization includes zeroing out the register 206, zeroing out of the presentation time, and zeroing out the time since the last synchronization check.

At a 'receive MPEG data' step 305, MPEG data is obtained at the memory interface 201.

A 'check synchronization' decision step 311 determines whether the adjustment should be checked. In a preferred embodiment the synchronization is checked approximately every 10 minutes, measured using local clock time. The periodicity of the measurement and the interval is not critical. If it has been less than 10 minutes since the synchronization was checked then the 'check synchronization' decision step 311 result is NO and the process proceeds to a 'demultiplex data' step 319 described below.

On the other hand, if it has been 10 minutes or more since the last time the synchronization was checked, the result of the 'check synchronization' decision step 311 is YES and the process proceeds to a 'detect time stamp' step 312. In this step the data stream is monitored and the next time stamp is detected. The data flows through to a 'demultiplex data' step 319 until a time stamp is detected in the data stream. Upon detecting a timestamp, the process proceeds to a 'compare presentation time with timestamp' step 313. (In an alternate embodiment that measures the time between synchronizations using the elapsed time, the 'detect time stamp' step 312 must be prior to the 'check synchronization' decision step 311.)

It is to be noted that in MPEG format the time-stamp is included in the system layer, which is above the packet layer. Because of where the time-stamp is located in the MPEG format, the time-stamp is detected prior to demultiplexing; for other digital video formats the opposite may be true. One skilled in the art will understand how to implement the invention accordingly.

The receiver presentation time in a preferred embodiment represents the total amount of time as measured at the receiver that the MPEG data has been presented, for example, it might be the length of time since the start of a movie. In a preferred embodiment, the server elapsed time is estimated to be the time elapsed from the beginning of the MPEG data, taken from the timestamp value. (It is not possible to directly measure, at the receiver, the server clock rate.) Using the total presentation time and total elapsed time has the effect of adjusting for the cumulative error caused by the clocks' errors and eliminates the need to keep track of errors caused by the finiteness of the audio data sampling, as described below.

In an alternate embodiment an intermediate time interval (i.e. measured from a point later than the start of receiving data) can be used.

If the difference between the presentation time and server elapsed time is less than the time required to process a specified number of audio samples, the difference is considered acceptable, the output of the 'make adjustment' decision step 315 is NO, and the process proceeds to the 'demultiplex data' step 319. If the difference is at least half the audio time interval, the difference is considered unacceptable and the result of the 'make adjustment' decision step 315 is YES, and the process proceeds to a 'calculate adjustment and set register' step 317.

In a preferred embodiment, the specified number of audio samples is about 100 samples. However, the actual number of samples is not critical so long as a discrepancy between the server elapsed time and the presentation time can be timely detected and compensated for.

The 'calculate adjustment and set register' step 317 compares the receiver presentation time with the server elapsed time. This difference between these times is converted into an integer value that represents the number of samples that must be added or dropped to synchronize the presentation with the served data. The integer value is preferably calculated by dividing the time difference by the time interval of the audio data and then rounding the absolute value of the difference. If the presentation lags the served data, the integer value is negated. In an alternate embodiment, where an intermediate time interval is used, the difference between the integer value and the number that is rounded to the integer can be stored and taken into account the next time an adjustment is made.

The register 206 is set to this integer value, and the process proceeds to the 'demultiplex data' step 319.

It is to be noted that in the preferred embodiment the total presentation time is compared to the total elapsed time. Because each comparison is made of the total times, there is less error and there is no need to track the round-off error caused by only being able to add or drop integer numbers of bytes. Where an intermediate time interval is used, the round-off error should be kept track of.

In the 'demultiplex data' step 319, the data is demultiplexed into an audio stream and a video stream, as known in the art. The demultiplexing of data preferably occurs in parallel with the steps 312-317.

In an 'adjust audio stream' step 321, the audio component is adjusted in the following manner, responsive to the register 206. If the register 206 is positive, a corresponding number of sample points are added to the audio stream, thereby synchronizing the presentation of data at the receiver with the server rate. If the register 206 is negative, a corresponding number of samples are dropped from the audio stream. As the samples are added or deleted, the register is adjusted to reflect the addition or deletion (not shown on figures). However, there are many ways of adding or dropping samples based on the value in the register, and one skilled in the art will understand how to do so.

In a preferred embodiment, one or more samples are added by duplicating the sample then passing through the adjustor 205 the appropriate number of times. For example, the sample passing through the adjustor 205 at any time the register 206 is non-zero will be duplicated N times if the register is N, a positive integer. Other ways of adding data are described subsequently. In the preferred embodiment, an audio sample is 4 bytes.

It is to be noted the adjustment may be stored other than in the described register. For instance, the amount of adjustment to be made can be stored in RAM.

In a preferred embodiment, one or more sample points are dropped from the audio stream by dropping the appropriate number of samples then passing through the adjustor 205, whenever the register has a negative value.

In an alternative embodiment, the audio data steam can be adjusted at specific time intervals, such as every 15 minutes.

In an alternative embodiment, samples can be added by methods other than duplication, for instance by averaging surrounding sample values and duplicating this average value the desired number of times.

The timing of when the adjustment is made and the manner in which sample data is added or deleted is not critical. In a preferred embodiment, the adjustment is made whenever the register contains a non-zero value, and addition of N samples is made by duplication N times of the sample then passing through the adjustor, deletion of N samples by dropping the next N samples that pass through the adjustor.

The process proceeds to a 'synchronize video to audio' step 325, where the video stream is synchronized to the adjusted audio stream. If the video stream and the adjusted audio stream are not aligned, that is, the timing information does not agree, then the video stream is adjusted to match the adjusted audio stream, as known in the art. The audio stream and video stream are converted to analog signals in a 'convert to analog' step 327 using the audio digital/analog converter 215 and the video digital/analog converter 217, respectively. The audio and video signals are output through the audio connector 219 and the video connector 221, respectively, for presentation.

CONCLUSION

One skilled in the art will understand that the invention provides a method for synchronize presentation of video data at a receiver with the rate the data is served by a video server, by making real-time adjustments to the audio stream and synchronizing presentation time and server elapsed time. The invention has the advantage that a phase lock loop circuit is not required, and that it is less expensive than existing methods.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A method of synchronizing a formatted presentation data stream to a clock, the method comprising:
   demultiplexing the formatted presentation data stream into a plurality of data streams;
   comparing a time stamp of one or more time stamps embedded in the formatted presentation data stream to time indicated by the clock to determine a relationship between a stamp time indicated by the time stamp and the time indicated by the clock, the time stamp corresponding to an external clock of a source providing the formatted presentation data stream, the clock being different from the external clock;
   adjusting a first data stream of the plurality of data streams to synchronize the first data stream to the clock, resulting in an adjusted first data stream; and
   synchronizing a second data stream to the plurality of data streams to the adjusted first data stream;
   wherein, when the step of comparing results in a determination that the time indicated by the clock leads by at least a predetermined amount the stamp time indicated by the time stamp, the step of adjusting comprises averaging one or more samples of the first data stream into an average value and inserting the average value into the first data stream one or more times.

2. A method of synchronizing the formatted presentation data stream to the clock according to claim 1, wherein the step of comparing is performed at periodic intervals.

3. A method of synchronizing the formatted presentation data stream to the clock according to claim 2, wherein the periodic intervals are spaced about 10 minutes apart.

4. A method of synchronizing the formatted presentation data stream to the clock according to claim 2, wherein the periodic intervals are spaced between 5 and 10 minutes apart.

5. A method of synchronizing the formatted presentation data stream to the clock according to claim 2, wherein the periodic intervals are spaced about 15 minutes apart.

6. A method of synchronizing the formatted presentation data stream to the clock according to claim 2, wherein the formatted presentation data stream comprises MPEG coded data, the first data stream comprises audio data, and the second data stream comprises video data.

7. A method of synchronizing the formatted presentation data stream to the clock according to claim 1, wherein the formatted presentation data stream comprises MPEG coded data, the first data stream comprises audio data, and the second data stream comprises video data.

8. A method of synchronizing the formatted presentation data stream to the clock according to claim 1, wherein the step of adjusting comprises duplicating one or more samples of the first data stream and inserting the duplicated one or more samples into the first data stream when the step of comparing results in an additional determination that the time indicated by the clock leads by at least an additional predetermined amount the stamp time indicated by the time stamp.

9. A method of synchronizing the formatted presentation data stream to the clock according to claim 1, wherein the step of adjusting comprises dropping one or more samples of the first data stream when the step of comparing results in a determination that the time indicated by the clock lags by at least a predetermined amount the stamp time indicated by the time stamp.

10. A method of synchronizing the formatted presentation data stream to the clock according to claim 1, further comprising detecting the time stamp.

11. A method of synchronizing the formatted presentation data stream to the clock according to claim 1, further comprising:
    presenting data of the first data stream and the second data stream after the step of synchronizing.

12. An apparatus for synchronizing a formatted presentation data stream to a clock, the apparatus comprising:
    a demultiplexer capable of demultiplexing the formatted presentation data stream into a plurality of data streams, the plurality of data streams comprising a first data stream and a second data stream;
    a comparator capable of comparing a time stamp of one or more time stamps embedded in the formatted presentation data stream to time indicated by the clock to determine a relationship between a stamp time indicated by the time stamp and the time indicated by the clock, the time stamp corresponding to an external clock of a source providing the formatted presentation data stream, the clock being different from the external clock;
    an adjustor capable of adjusting the first data stream to synchronize the first data stream to the clock, resulting in an adjusted first data stream; and
    a synchronizer capable of synchronizing the second data stream to the adjusted first data stream;
    wherein, when the comparator produces a determination that the time indicated by the clock leads by at least a predetermined amount the stamp time indicated by the time stamp, the adjustor averages one or more samples of the first data stream into an average value and inserts the average value into the first data stream on or more times.

13. An apparatus for synchronizing the formatted presentation data stream to the clock according to claim 12, wherein the comparator performs comparisons at periodic intervals.

14. An apparatus for synchronizing the formatted presentation data stream to the clock according to claim 12, wherein the comparator performs comparisons at periodic intervals spaced about 10 minutes apart.

15. An apparatus for synchronizing the formatted presentation data stream to the clock according to claim 12, wherein the comparator performs comparisons at periodic intervals spaced between 5 and 10 minutes apart.

16. An apparatus for synchronizing the formatted presentation data stream to the clock according to claim 12, wherein the comparator performs comparisons at periodic intervals spaced about 15 minutes apart.

17. An apparatus for synchronizing the formatted presentation data stream to the clock according to claim 12, wherein the formatted presentation data stream comprises MPEG coded data, the first data stream comprises digital audio data, and the second data stream comprises digital video data.

18. An apparatus for synchronizing the formatted presentation data stream to the clock according to claim 17, further comprising:
    a first converter configured to convert the digital audio data to analog audio data;
    an audio presentation device configured to present the analog audio data;
    a second converter configured to convert the digital video data into analog video data; and
    a video presentation device configured to present the analog video data.

19. An apparatus for synchronizing the formatted presentation data stream to the clock according to claim 12, wherein adjustor is capable of duplicating one or more samples of the first data stream and inserting the duplicated one or more samples into the first data stream when the comparator produces an additional determination that the time indicated by the clock leads by at least an additional predetermined amount the stamp time indicated by the time stamp.

20. An apparatus for synchronizing the formatted presentation data stream to the clock according to claim 12, wherein the adjustor is capable of dropping one or more samples of the first data stream when the comparator produces a determination that the time indicated by the clock lags by at least a predetermined amount the stamp time indicated by the time stamp.

21. An apparatus for synchronizing the formatted presentation data stream to the clock according to claim 12, further comprising a time stamp detector capable of detecting the time stamp.

22. An article of manufacture comprising a memory storing program code, the program code comprising instructions that, when executed by at least one processor of a device comprising a clock and capable of receiving a formatted presentation data stream, cause the at least one processor to perform the following steps:
    demultiplexing the formatted presentation data stream into a plurality of data streams;
    comparing a time stamp of one or more time stamps embedded in the formatted presentation data stream to time indicated by the clock to determine a relationship between a stamp time indicated by the time stamp and the time indicated by the clock, the time stamp corresponding to an external clock of a source providing the formatted presentation data stream, the clock being different from the external clock;
    adjusting a first data stream of the plurality of data streams to synchronize the first data stream to the clock, resulting in an adjusted first data stream; and
    synchronizing a second data stream to the plurality of data streams to the adjusted first data stream;
    wherein, when the step of comparing results in a determination that the time indicated by the clock leads by at least a predetermined amount the stamp time indicated by the time stamp, instructions cause the at least one processor to average one or more samples of the first data stream into an average value and insert the average value into the first data stream on or more times.

23. An article of manufacture according to claim 22, wherein the instructions, when executed by the at least one processor cause the processor to perform the step of comparing at periodic intervals.

24. An article of manufacture according to claim 23, wherein the instructions, when executed by the at least one processor cause the at least one processor to perform the step of comparing at the periodic intervals spaced about 10 minutes apart.

25. An article of manufacture according to claim 23, wherein the instructions, when executed by the at least one processor cause the at least one processor to perform the step of comparing at the periodic intervals spaced between 5 and 10 minutes apart.

26. An article of manufacture according to claim 23, wherein the instructions, when executed by the at least one processor cause the at least one processor to perform the step of comparing at the periodic intervals spaced about 15 minutes apart.

27. An article of manufacture according to claim 23, wherein the formatted presentation data stream comprises MPEG coded data, the first data stream comprises audio data, and the second data stream comprises video data.

28. An article of manufacture according to claim 22, wherein the formatted presentation data stream comprises MPEG coded data, the first data stream comprises audio data, and the second data stream comprises video data.

29. An article of manufacture according to claim 22, wherein the instructions, when executed by the at least one processor in the course of performing the step of adjusting, cause the at least one processor to duplicate one or more samples of the first data stream and insert the duplicated one or more samples into the first data stream when the step of comparing results in an additional determination that the time indicated by the clock leads by at least an additional predetermined amount the stamp time indicated by the time stamp.

30. An article of manufacture according to claim 22, wherein the instructions, when executed by the at least one processor cause the at least one processor, in the course of performing the step of adjusting, to drop one or more samples of the first data stream when the step of comparing results in a determination that the time indicated by the clock lags by at least a predetermined amount the stamp time indicated by the time stamp.

31. An article of manufacture according to claim 22, wherein the program code further comprises instructions that, when executed by the at least one processor cause the at least one processor to detect the time stamp.

32. The method of claim 1 further comprising:
    receiving the formatted data stream from the source including the external clock.

33. The method of claim 1 wherein the clock is a local clock.

34. The apparatus of claim 12 further comprising:
    an interface for receiving the formatted data stream from the source including the external clock.

35. The apparatus of claim 12 wherein the clock is a local clock.

36. The article of manufacture of claim 22, wherein the program code further includes instructions that, when executed by at least one processor of a device comprising a clock and capable of receiving a formatted presentation data stream, cause the at least one processor to perform the following steps:

receiving the formatted data stream from the source including the external clock.

37. The article of manufacture of claim 22 wherein the clock is a local clock.

* * * * *